Sept. 29, 1959     F. J. JONKO ET AL     2,906,936
WORK PROTECTING SWITCH FOR ELECTRIC MOTORS
Filed July 6, 1956     2 Sheets-Sheet 1
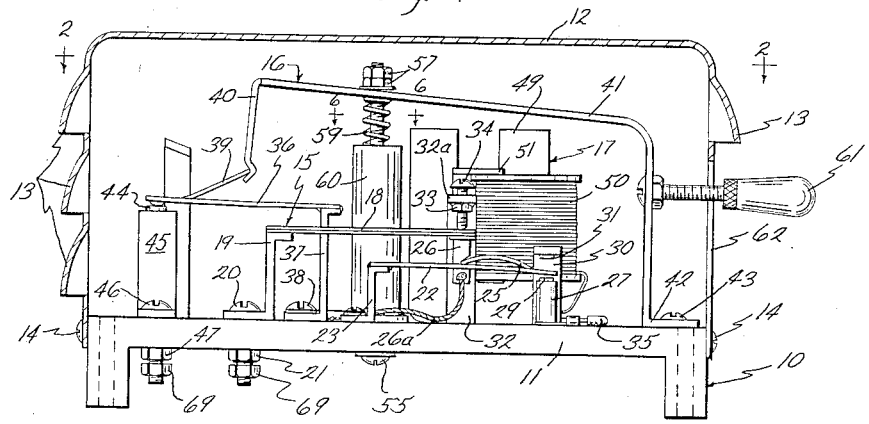
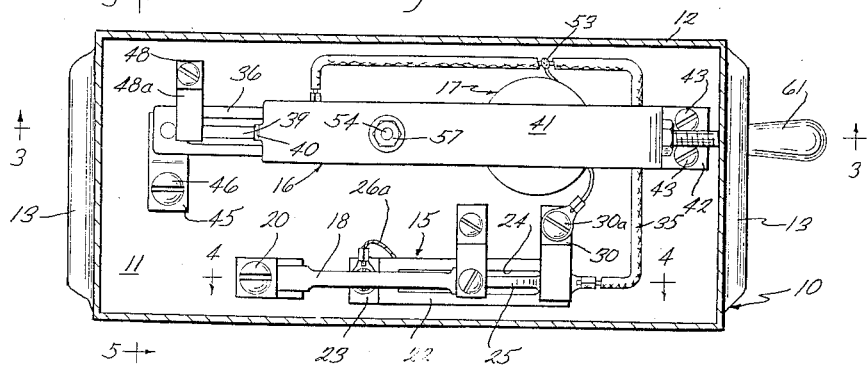
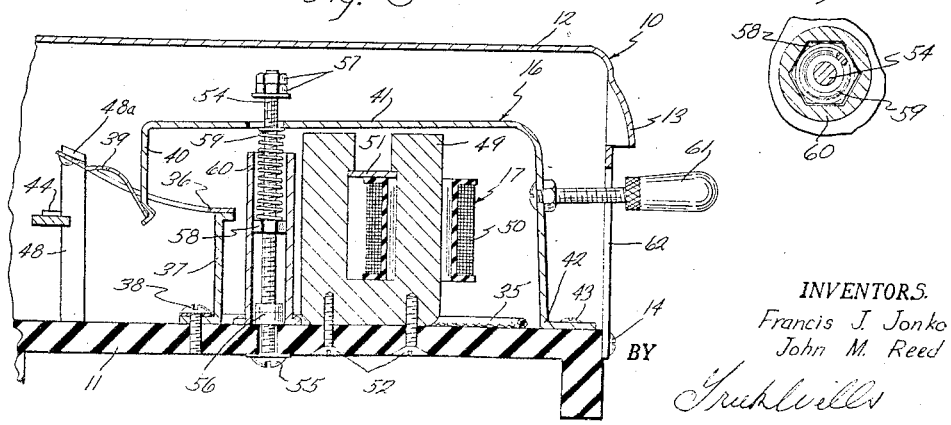
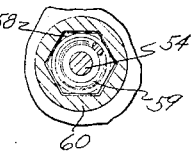
INVENTORS.
Francis J. Jonko
John M. Reed
BY
Atty.

Sept. 29, 1959   F. J. JONKO ET AL   2,906,936
WORK PROTECTING SWITCH FOR ELECTRIC MOTORS
Filed July 6, 1956   2 Sheets-Sheet 2
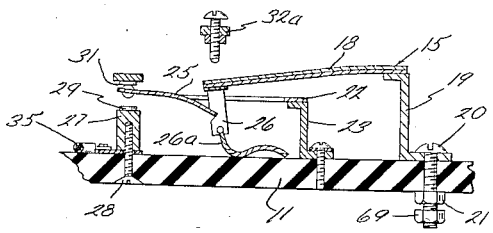
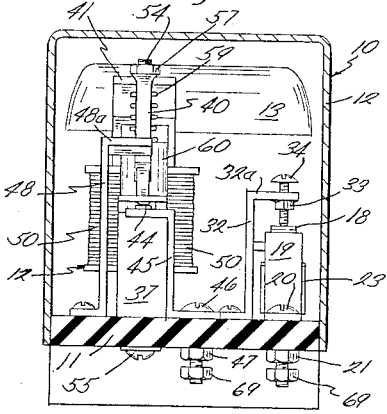
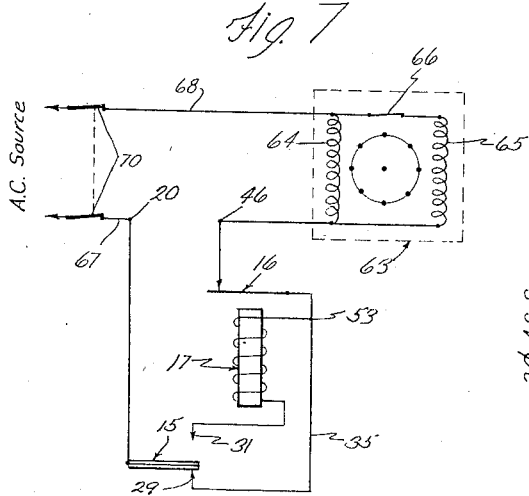
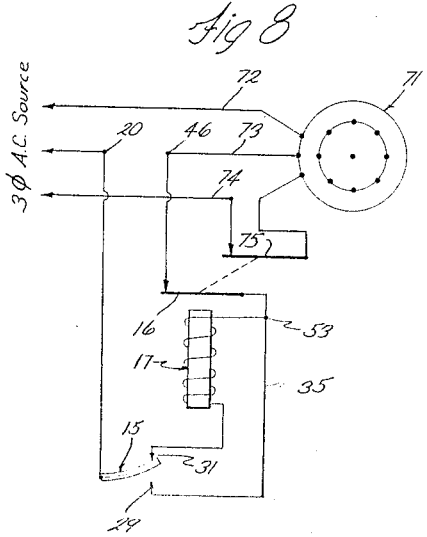
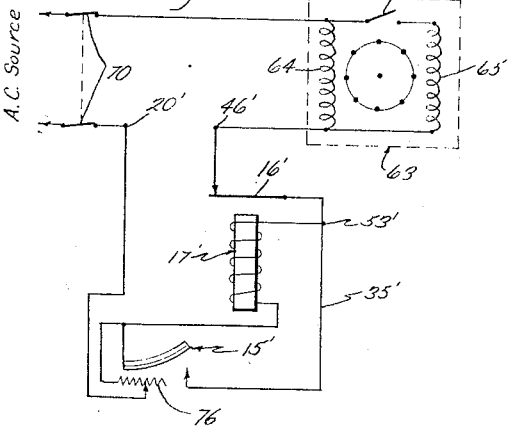
INVENTOR.
Francis J. Jonko
John M. Reed
BY
Atty.

United States Patent Office 2,906,936
Patented Sept. 29, 1959

2,906,936

WORK PROTECTING SWITCH FOR ELECTRIC MOTORS

Francis J. Jonko and John M. Reed, Spokane, Wash.

Application July 6, 1956, Serial No. 596,223

3 Claims. (Cl. 318—447)

The present invention relates to improvements in a work protecting switch for electric motors.

In certain motor driven work performing devices, the motor driven mechanism is relatively delicate, and cannot withstand even minor overloads. An example of such a device is an icecream freezing machine. The motor driven beaters of such machines are often broken when the icecream mix sets up rapidly and causes a rapid overload of the machine. The overload causes the beaters to break before it becomes large enough to actuate the motor overload breaker.

Considerable work has been done in the perfection of overload breakers for electric motors, but since a motor can and must be capable of withstanding minor overloads, and since electric motors must draw heavy current when starting to overcome inertia, these overload breakers are constructed so that they are unaffected by minor or transitory overloads in the range of 1% to as much as 10% of the normal full load current of the machine. An overload which would draw a current of, for example, 103% full load current for two or three seconds only, would not actuate a normal overload breaker. Such an overload, however, might well cause damage to a delicate mechanism driven by the motor, and in an icecream freezing machine, might break the beaters.

It is the principal purpose of the present invention to provide a control circuit for a motor driven work performing device which will open the motor circuit when the motor draws current of a predetermined magnitude above the normal full load current, even though the magnitude of the overload current is considerably less than the normal starting current and exists only for a short time.

A further purpose of the invention is to provide such a control circuit which will allow a high starting current to flow to the motor for a short period after initial energization of the motor, but will operate to protect the driven mechanism against overloads drawing a smaller current, after the starting current is abated.

A still further purpose of the invention is to provide such a control circuit which will open the motor circuit during the starting period, if the starting current is above the normal starting current magnitude, or if the starting current exists beyond the normal duration.

To accomplish these purposes we provide a main breaker switch and a bimetallic switch connected in series in one of the current supply lines to the motor. An electromagnet, capable of opening the breaker switch by attraction is also provided. The electromagnet is so connected that when the bimetallic switch is cold, and in engagement with one contact, the electromagnet is by-passed by current flowing to the motor. However, when the bimetallic switch has been heated due to the current flow therethrough and bends to engage a second contact, the electromagnet is placed in series with the breaker switch. Biasing means are provided to prevent the attraction of the electromagnet from opening the breaker switch when the electromagnet carries full load current and until a predetermined amount of overload current is present. When current of sufficient magnitude to overcome the biasing means exists, the breaker switch is attracted and opened to cut off current supply to the motor. The time necessary to heat the bimetallic switch sufficiently to cause it to engage the second contact and place the electromagnet in the line represents the time when high starting current may flow to the motor without causing the breaker switch to open.

The nature and advantages of the invention will appear more clearly from the following description and the accompanying drawings, wherein a preferred form of the invention is shown. It should be understood, however, that the description and drawings are illustrative only and are not intended to limit the invention except insofar as it is limited by the claims.

In the drawings:

Figure 1 is a side elevational view of a control device embodying our invention, with the cover member thereof broken away;

Figure 2 is a plan sectional view of the device illustrated in Figure 1, taken on the line 2—2 of Figure 1;

Figure 3 is a vertical sectional view taken on the line 3—3 of Figure 2, but showing the main breaker switch opened;

Figure 4 is a vertical sectional view taken on the line 4—4 of Figure 2, but showing the bimetallic switch in a different position;

Figure 5 is a vertical sectional view taken on the line 5—5 of Figure 2;

Figure 6 is an enlarged fragmentary sectional view taken on the line 6—6 of Figure 1;

Figure 7 is a circuit diagram illustrating the control circuit connected to a single phase induction motor;

Figure 8 is a circuit diagram showing a modified form of the invention for use with a three phase induction motor; and Figure 9 is a circuit diagram showing a further modified form of the invention.

Referring now to the drawings, our invention is illustrated as embodied in a control unit 10 which comprises a non-conductive base 11 and a cover member 12. The cover member 12 has ventilating louvres 13 therein and is removably mounted to the base 11 by screws 14. On the base 11 are mounted the three general elements of the control circuit, a bimetallic switch unit generally indicated at 15, a main breaker switch unit generally indicated at 16, and an electromagnet generally indicated at 17.

The bimetallic switch unit 15 is best shown in Figures 1, 2 and 4. The switch unit 15 comprises a bimetallic strip 18 secured at one end to a mounting post 19 which is fixed on the base 11 by a bolt 20 and a nut 21. The bimetallic strip 18 does not itself have contact points thereon, but rather operates as a control device for a snap-over switch 22. The switch 22 is constructed of spring metal and supported at one end on a post 23. The switch 22 has a slot 24 extending longitudinally thereof, and has a center tab 25 formed at the end of the slot 24 near the free end of the switch 22. The center tab 25 extends rearwardly in the slot 24. The bimetallic strip 18 extends over the switch 22 and has at its free end, a depending lug 26 which extends through the slot 24 in the switch 22. The free end of the center tab 25 is engaged in a notch in the lug 26. The tab 25, however, is longer than the distance from the lug 26 to the end of the slot 24 at which the tab 25 joins the switch 22, so it is bowed upwardly. So long as the end of the tab 25, which is engaged with the lug 26, is positioned above the plane of the switch 22, the tendency of the tab to straighten out forces the free end of the switch 22 downward. However, when the lug 26 is moved downwardly and carries the end of the tab 25 below the plane of the switch 22, the tendency of the tab to straighten will force the switch upwardly. A post 27 mounted beneath the switch 22 by a screw 28 (see Figure 4) carries a contact point 29 which is engaged by the switch 22 when it is held downwardly. A bracket 30 extending upwardly beside the switch 22 has a projection extending over the switch 22 which carries a second contact point 31 which contact point is engaged by the switch 22 when it is toggled upwardly. The bracket 30 is secured to the base by a screw 30a. To insure sufficient electrical contact between the strip 18 and switch 22, a flexible cable 26a is connected between the lug 26 and the mounting post 23 of the switch 22.

The bimetallic strip 18, when cold, holds the switch 22 in engagement with the lower contact point 29. When the strip 18 is heated, it bends downwardly as shown in Figure 4 and snaps the switch 22 into engagement with the upper contact 31. By the use of the spring metal switch 22 with its actuating center tab 25, the relatively slow bending of the strip 18 causes an almost instantaneous movement of the switch 22 from one contact 29 or 31 to the other. In order to control the amount of heating necessary to bend the strip 18 sufficiently to operate the switch 22, a bracket 32 is provided on the base 11 which has an upper portion 32a extending over the strip 18. The portion 32a has a nut 33 fixed thereon which receives an adjusting screw 34. The screw 34 extends downwardly as shown in Figures 1 and 4, into engagement with the strip 18. By adjusting the screw 34, the uppermost position of the strip that is the "cold" position, can be adjusted. By adjusting the screw 34 so that the uppermost position of the strip 18 is such that the slightest downward movement will toggle the switch 22, the switch unit 15 can be made to operate a fraction of a second after current is passed through the strip 18. By adjusting the screw 34 upwardly, the heating time necessary to toggle the switch 22 and thus operate the switch unit 15 may be lengthened.

The lower contact 29 of the switch unit 15 is electrically connected by a wire 35 to a second snap-over switch 36 which forms part of the main breaker switch unit 16. The snap-over switch 36 is supported at one end by a mounting post 37 which is secured to the base 11 by a screw 38. The switch 36 has a center tab 39 by which it is toggled in the same manner as the switch 22. The tab 39 is engaged with an arm 40 depending from the free end of an armature 41. The armature 41 is constructed of spring metal and is bent downwardly at its opposite end to form a mounting bracket 42 which is secured by screws 43 to the base 11. The armature is flexible enough to bend from the position shown in Figure 1 to that shown in Figure 3 with ease.

When the armature 41 is in the position shown in Figure 1, it holds the snap-over switch 36 down against a contact point 44 carried by a bracket 45. The bracket 45 is mounted on the base 11 by a bolt 46 and nut 47. When the armature is moved toward the base 11 to the position shown in Figure 3, the switch 36 is toggled upwardly away from the contact 44. A stop bracket 48 is mounted on the base 11 beside the switch 36 and has a top portion 48a which extends over the switch 36 to limit its upward movement when the armature is moved down to toggle the switch 36 away from the contact 44.

The electromagnet 17 is mounted beneath the armature 41 of the breaker switch unit 16. The electromagnet 17 comprises a U-shaped iron core member 49 and a current coil 50, which is mounted on one leg of the core 49. The coil 50 is held in place by a keeper 51. The electromagnet 17 is secured to the base 11 by screws 52. One end of the coil 50 is electrically connected to the upper contact 31 of the switch unit 15 through the bracket 30. The opposite end of the coil 50 is electrically connected to the lower contact 29 through connection with the wire 35 as shown at 53 in Figure 2.

When the electromagnet 17 is energized by passing current through the coil 50, a magnetic field is set up in the core 49 which attracts the armature 41 downward, causing it to toggle the switch 36 to its open position. Of course, the attraction of the electromagnet for any given current is a function of the number of turns in the coil 50. The coil 50 should be wound so that full load current of the motor to be controlled will exert enough force to attract the armature 41. Then by providing adjustable biasing means to hold the armature against movement, the device can be adjusted so that any desired amount of current from full load current up, will cause the electromagnet 17 to attract the armature 41.

In order to provide such adjustable biasing means, we mount on the base 11, a bolt 54 which extends upwardly through the armature 41. The bolt 54 has a head 55 at the bottom and lock nuts 56 thereon positioned immediately above the base 11 to support the bolt 54 on the base 11. The bolt 54, however, is rotatable by rotation of the head 55. Second lock nuts 57 on the bolt 54 above the armature 41 act as stop means to limit the upward movement of the armature 41. The bolt 54 has a nut 58 threaded thereon between the base 11 and the armature 41. A bias spring 59 is interposed on the bolt 54 between the nut 58 and the armature 41. The bias spring urges the armature upwardly against the lock nuts 57. By adjusting the upward force exerted by the spring 59, the amount of overload current necessary to attract the armature 41 can be adjusted. To provide for this adjustment, a sleeve 60 having a hexagonal aperture therein (see Figure 6) is provided around the bolt 54. The sleeve slidably but non-rotatably receives the nut 58. By rotation of the bolt 54, the nut 58 may be threaded up and down thereon, it being held against rotation by the sleeve 60, thus adjusting the upward force of the bias spring 59.

Once the armature 41 has been attracted down by the electromagnet 17, it remains in that position until reset. The snap-over switch 36, having toggled to the open position, has enough force to hold the armature down. In order to return the armature to its normal position a reset lever 61 is provided. The lever 61 is fixed to the vertical portion 42 of the armature 41 and extends through a slot 62 in the cover 12 of the control unit 10. When the lever 61 is pushed down, it bends the portion 42 of the armature 41 back and lifts the armature 41, snapping the switch 36 to its normally closed position.

Figure 7 best illustrates the operation of the unit 10, and its connection in the circuit of a single phase electric motor. The motor is shown at 63 as a single phase squirrel cage induction motor having a running winding 64 and a starting winding 65 connected in parallel therewith. A switch 66 is provided to disconnect the starting winding after the motor 63 has reached a certain speed. The motor 63 is connected to a power source through power leads 67 and 68. Our control unit 10 is placed in series with the motor 63 in one of the power leads. The bolt 20 of the bimetallic strip supporting post 19 and the bolt 46 of the post 45 which carries the main breaker switch contact 44 serve as terminals to which the power lines may be connected. Each of the bolts 20 and 46 has a second nut 69 threaded thereon for this purpose.

When one of the power leads to the motor 63 is broken and connected to the terminals 20 and 46 as shown in Figure 7, current flowing to the motor 63 must pass through the bimetallic switch unit 15. When the main motor switch shown at 70 is closed to start the motor 63, the strip 18 is cold and the switch unit 15 is in contact with the lower contact point 29. The starting current for the motor 63 is therefore passed through contact 29 and line 35 to the main breaker switch unit 16, by-passing the electromagnet 17. The breaker switch 16, being closed, allows the current to flow to the motor 63. After sufficient time has elapsed to allow the strip 18 to heat due to current flow therein, the switch unit 15 is actuated and engages contact 31. The motor current then flows through the electromagnet 17 and the breaker switch 16 and thence to the motor 63. The adjusting screw 34 of the bimetallic switch unit 15 should be adjusted so that the amount of current flow necessary to heat the strip 18 sufficiently to actuate the switch unit corresponds to the maximum normal starting current duration. If this adjustment is properly made, the starting current, under normal conditions, will abate before the electromagnet 17 is switched into the circuit. After the electromagnet 17 is switched into the circuit, overload current of sufficient magnitude to overcome the bias spring 59 and attract the armature 41 will cause the main breaker switch unit 16 to open. By proper adjustment of the spring 59 through rotation of the bolt 54, the amount of overload current necessary to open the switch 16 may be varied to meet the requirements of the particular installation. We have found that our circuit, when connected to a one-fourth horsepower induction motor, drawing 3-6 amperes at full load, may be adjusted to shut off the motor for overloads as small as 2 percent of the full load current.

When the overload has caused the switch 16 to open and stop the motor 63, the bimetallic strip 18 begins to cool, and returns the switch unit 15 to starting position. The operator must push the reset lever 61 to close the breaker switch 16.

Now in the event that the motor 63 is overloaded when it is started, the starting current will be higher than normal, and will heat the strip 18 faster, causing the electromagnet 17 to be switched into the circuit while the starting current still exists. This will cause the switch 16 to be opened immediately upon the introduction of the electromagnet into the circuit. In tests of a control unit constructed in accordance with the invention and properly adjusted, we have found that an overload of 2 per cent of full load current on the one-fourth horsepower motor mentioned above, existing at the time the motor was started, caused the switch unit 15 to switch the electromagnet 17 into the circuit and open the breaker switch 16 in one-half of one second. Overloads of 3 per cent of full load current existing when the motor was started caused the switch 16 to open and break the circuit instantaneously.

Figure 8 illustrates a slightly modified form of our invention adapted for use with a three phase motor. The numeral 71 indicates a three phase squirrel cage induction motor, connected to a power source by three power leads 72, 73 and 74. Power to a three phase motor can only be entirely disrupted by opening two of the three power leads, so it is necessary in this form of the invention to provide two main breaker switches. We therefore provide a second main breaker switch 75 which is ganged with the breaker switch 16. The remainder of the circuit is identical to the main form of the invention. The control unit 10' is connected in any one of the lines 72, 73 or 74 in the same manner as in the main form of the invention, that is, by breaking the line and connecting the ends to terminals 20 and 46 so that current flowing to the motor in that line must flow through the switch unit 15 and the breaker switch 16. The additional breaker switch 75 is connected in either of the remaining power lines 72 or 74. As in the main form of the invention, the starting current flowing in the line 73 passes through the bimetallic strip 18 and in time causes it to heat, switching the electromagnet 17 into the circuit. After the electromagnet 17 is in the circuit, overloads of a predetermined amount will cause the switches 16 and 75 to open and shut off the motor 71.

Figure 9 illustrates a modified form of the invention wherein the bimetallic switch unit 15' is only a single contact switch. In this form of the invention, the electromagnet 17' is connected directly to the terminal 20' instead of being connected to a contact of the bimetallic switch 15', and is therefore connected directly in series with the breaker switch 16'. The bimetallic switch 15' then in its closed "cold" position merely shorts out the electromagnet 17' and establishes a current by-pass through line 35'. With this form of the invention a heater is needed for the bimetallic strip, since when the switch 15' is opened after heating, current no longer flows through it. We therefore provide a variable resistance heater 76 connect in series with the switch 16' and physically placed adjacent the bimetallic strip to maintain the temperature of the strip after heating. By varying the resistance of this heater 76, the time after starting the motor necessary to heat the bimetallic strip in the switch 15 may be varied to closely correspond to the time during which starting current flows to the motor 63.

Our invention provides an effective means for protecting delicate work performing devices against overloads which might otherwise cause damage, even when the overloads are such that the overload current of the motor is only slightly greater than the normal full load current and less than the starting current. Our invention operates to shut off the motor almost instantaneously upon overloading so that even transitory overloads are prevented.

We believe the nature and advantages of the invention appear clearly from the foregoing.

Having thus described our invention, we claim:

1. In a work performing device including an electric motor, means to protect the work device against overloads, said means comprising a switch having a bimetallic element therein and having first and second contact points, the bimetallic element operable to move the switch against the first contact point when cold and operable to move the switch against the second contact point upon application of heat thereto, a main breaker switch having a single contact point, said switch being electrically connected to the first contact of said first named switch, an electromagnet electrically connected between the breaker switch and the second contact point of the first named switch, said main breaker switch including an armature operable upon attraction by the electromagnet to open the breaker switch, biasing means connected to the armature operable to resist the attraction of the electromagnet caused by a predetermined magnitude of current flow therein, said first named switch and the contact point of said main breaker switch being connected between the motor and one of its current supply lines whereby to cause current flowing to the motor to flow through said first named switch and said main breaker switch, and means to heat the bimetallic element when current flows through said first named switch.

2. In a work performing device including an electric motor, means to protect the work device against overloads, said means comprising a switch having a bimetallic element therein and having first and second contact points, the bimetallic element operable to move the switch against the first contact point when cold and operable to move the switch against the second contact point upon application of heat thereto, a main breaker switch having a single contact point, said switch being electrically connected to the first contact of said first named switch, an electromagnet electrically connected between the breaker switch and the second contact point of the first named switch, said main breaker switch including an armature operable upon attraction by the electromagnet to open the breaker switch, a spring contacting said armature and resisting the attractive force of the electromagnet, the opposite end of said spring contacting a spring support member, said spring support member being movable toward and away from the armature to vary the resistive force of the spring, said first named switch and the contact point of said main breaker switch being connected between the motor and one of its current supply lines whereby to cause current flowing to the motor to flow through said first named switch and said main breaker switch, and means to heat the bimetallic element when current flows through said first named switch.

3. In a work performing device including an electric motor, means to protect the work device against overloads, said means comprising a switch having a bimetallic element therein and having first and second contact points, the bimetallic element operable to move the switch against the first contact point when cold and operable to move the switch against the second contact point upon application of heat thereto, a main breaker switch having a single contact point, said switch being electrically connected to the first contact of said first named switch, an electromagnet electrically connected between the breaker switch and the second contact point of the first named switch, said main breaker switch including an armature operable upon attraction by the electromagnet to open the breaker switch, a base member to which said first named switch and said electromagnet and said second main breaker switch are supported, a bolt supported on said base, a nut threaded on said bolt, a bias spring seated on said nut, the bias spring contacting the armature and resisting the attractive force of the electromagnet, means to thread the nut on the bolt toward and away from the electromagnet whereby to vary the attractive force of the spring, said first named switch and the contact point of said main breaker switch being connected between the motor and one of its current supply lines whereby to cause current flowing to the motor to flow through said first named switch and said main breaker switch, and means to heat the bimetallic element when current flows through said first named switch.

References Cited in the file of this patent
UNITED STATES PATENTS

| | | |
|---|---|---|
| 697,016 | Read | Apr. 8, 1902 |
| 991,189 | Barnum | May 2, 1911 |
| 2,085,116 | McShane | June 29, 1937 |